United States Patent [19]

Robbins, Jr.

[11] E Patent Number: Re. 32,707

[45] Reissued Date of Patent: Jul. 5, 1988

[54] COMPOSITE METAL AND PLASTIC FENCE

[76] Inventor: Edward S. Robbins, Jr., Rte. 7, Box 322, Florence, Ala. 25310

[21] Appl. No.: 768,679

[22] Filed: Aug. 23, 1985

Related U.S. Patent Documents

Reissue of:

[64] Patent No.: 4,465,263
Issued: Aug. 14, 1984
Appl. No.: 443,885
Filed: Nov. 23, 1982

U.S. Applications:

[63] Continuation-in-part of Ser. No. 239,377, Mar. 2, 1981, abandoned.

[51] Int. Cl.[4] ..... B21F 27/00

[52] U.S. Cl. ..... 256/52; 256/49; 256/54

[58] Field of Search ..... 256/54, 48, 13.1, 55, 256/49, 52

[56] References Cited

U.S. PATENT DOCUMENTS

| | | | |
|---|---|---|---|
| 336,889 | 3/1886 | Burns | 256/52 XR |
| 411,801 | 10/1889 | Fletcher | 256/48 X |
| 402,666 | 5/1889 | Grant | 256/52 XR |
| 508,687 | 11/1893 | Duggan | 256/54 X |
| 519,435 | 5/1894 | Schriver | 256/48 |
| 736,147 | 8/1903 | Peterson | 256/52 XR |
| 828,205 | 8/1906 | Glascock | 256/54 |
| 853,846 | 5/1907 | Tyler | 256/52 |
| 894,511 | 7/1908 | Linderman | 256/54 X |
| 1,720,859 | 7/1929 | Scott | 256/52 |
| 3,065,760 | 11/1962 | Cailas | 403/364 XR |
| 3,233,870 | 2/1966 | Gerhardt | 256/13.1 |
| 4,143,859 | 3/1979 | Tews | 256/49 |
| 4,422,348 | 12/1983 | Campbell | 403/344 XR |
| 4,465,263 | 8/1984 | Robbins, Jr. | 256/49 X |
| 4,533,120 | 8/1985 | Ruddock | 256/52 |

FOREIGN PATENT DOCUMENTS

| | | | |
|---|---|---|---|
| 571196 | 12/1957 | Italy | 13.1/ |
| 779411 | 7/1957 | United Kingdom | 403/331 |

*Primary Examiner*—Andrew V. Kundrat
*Attorney, Agent, or Firm*—Nixon & Vanderhye

[57] ABSTRACT

A fence composed of plastic-ensheathed metal wires affixed to posts or poles with clamps. The fence has excellent durability for relatively low cost, and will not harm valuable livestock. The simplicity of securing the fencing material to its supports permits rapid one-person installation. The fence is also aesthetically appealing.

7 Claims, 6 Drawing Sheets

FIG. 6
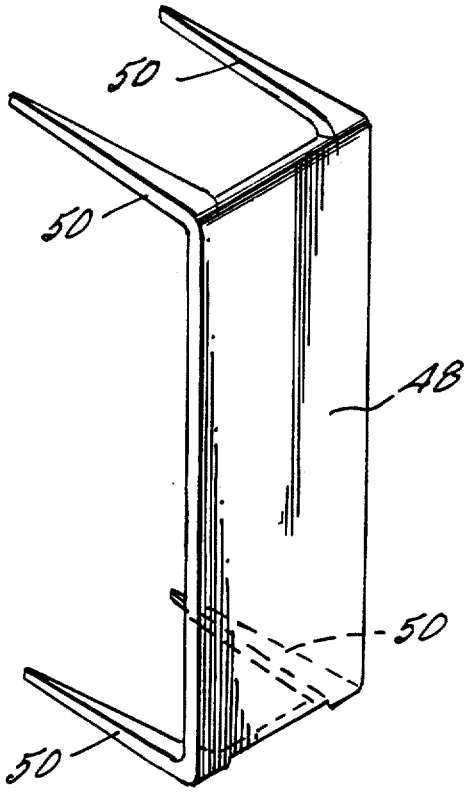
FIG. 5
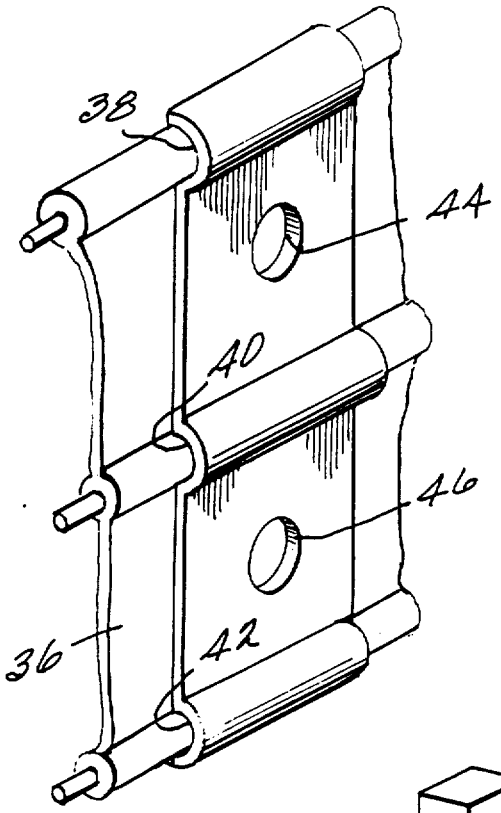
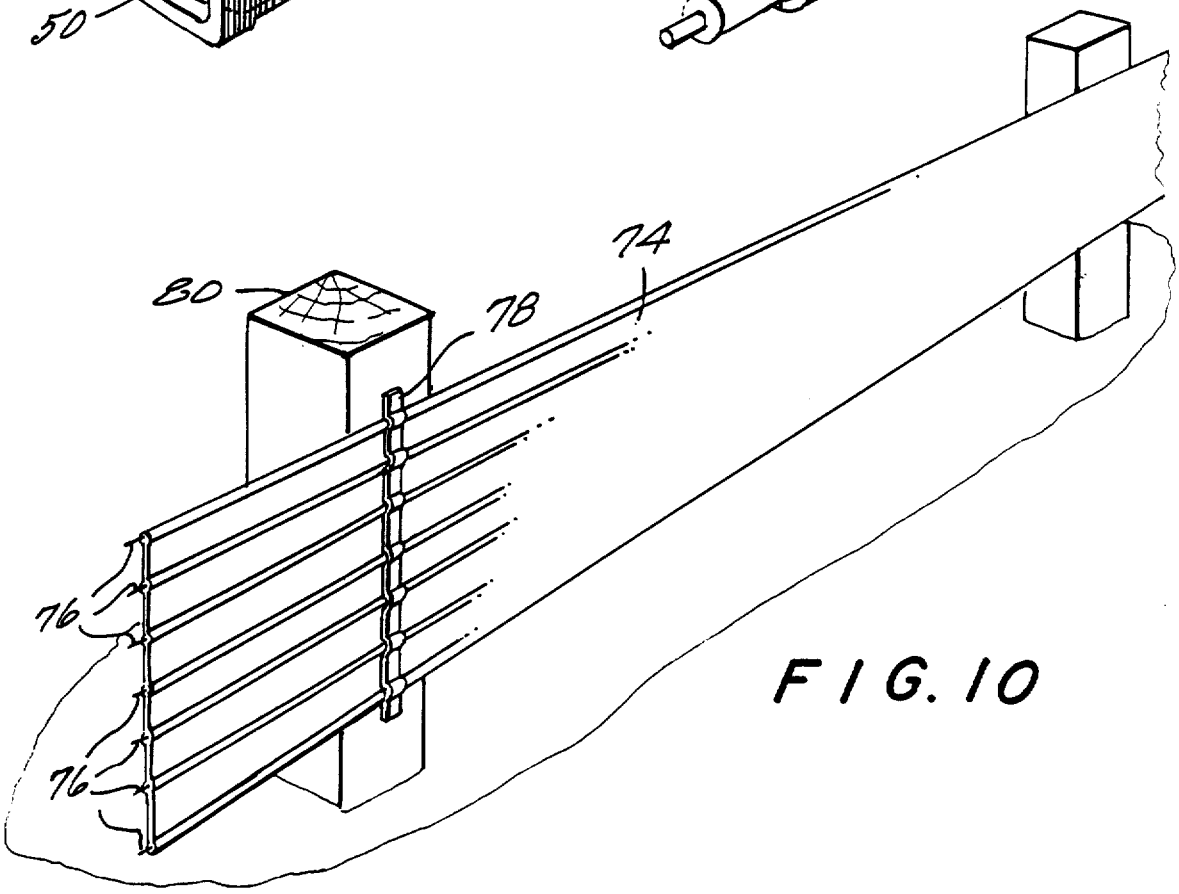
FIG. 10

COMPOSITE METAL AND PLASTIC FENCE

Matter enclosed in heavy brackets [ ] appears in the original patent but forms no part of this reissue specification; matter printed in italics indicates the additions made by reissue.

[COMPOSITE METAL AND PLASTIC FENCE]

This is a continuation-in-part application of application Ser. No. 239,377, filed Mar. 2, 1981 and now abandoned.

BACKGROUND OF THE INVENTION

1. Field of the Invention

This application relates generally to fencing material and brackets or similar structures, particularly those which are used to confine livestock.

2. Description of the Prior Art

Fences are the most commonly employed means for confining that which would otherwise escape and excluding that which would otherwise intrude. Fences may vary greatly in both structure and materials of composition. Common fence structures include wire fences, such as barbed wire and chain link, and wood fences such as, picket fences and split rail fences. Common fence materials include metal, wood and stone. Fence structure and composition are selected on the basis of initial and upkeep costs, durability, strength, aesthetic characteristics, and safety desired or required.

One very common form of fencing is barbed wire. The relatively low cost of purchasing, installing, and maintaining barbed wire fencing has made it the preeminent fencing material for enclosing livestock areas. Barbed wire suffers from the disadvantage, however, that its sharp barbs may cut or gouge the hide of valuable livestock. Furthermore, barbed wire has a very thin cross-section so that it is not easy to see; and an animal is correspondingly more apt to contact a barbed wire fence than it would be to contact a more visible barrier. Other types of wire fencing known in this art, such as web wire fencing, and cyclone wire fencing, suffer from similar limitations. These wire fences also tend to have poor aesthetic qualities and they tend to rust or corrode after a few years of service. Fences made entirely of wood, on the other hand, are typically safer and more pleasing to the eye, but are expensive to install and maintain.

In an effort to obtain both the visibility of wood fencing and the low cost and maintenance of wire fencing, some fences have been constructed of wire webbing with wooden boards enmeshed therein. The durability of these fences is limited by the tendency of wood to weather and rot. Another disadvantage is the relative costliness of wood as a fencing material and the constant expense of maintaining wood fences.

It is known in the prior art to use plastic rather than wood to increase durability and decrease cost. For example, U.S. Pat. No. 3,877,140, granted to Topolsek on Apr. 15, 1975, discloses a picket fence composed of metal and plastic. The fence described there, however, seems to be well suited to applications not requiring a great deal of strength, such as for snow fencing, and not applications such as for the confining of livestock.

SUMMARY OF THE INVENTION

The present invention is a composite metal and plastic fence comprised of at least two metal wires having high tensile strength ensheathed in a plastic casing and brackets for installing the fence. The wire may be of any diameter suitable to the strength required in service. For many applications, for example, 8, 12½ or 16 gauge wire may suffice. Between the wires, the plastic casing assumes the form of a sheet or web, so that the cross-section of a strip of fencing material according to one embodiment of the present invention taken perpendicular to the lengths of any pair of adjacent wires is approximately dumbbell-shaped. In a preferred form, the material encasing the wire protrudes on only one side of the web, the opposite being generally flat. The web itself may have any thickness but is preferably in the range of about 30 mils to 100 mils. When strung on supports, the metal wires run the length of the fence, the plastic casing both enclosing the wires and keeping them at a fixed vertical separation. A fence so constructed has the advantages of high visibility, good strength, and relatively low cost of purchase, installation and upkeep. Also, such a fence will neither cut nor gouge the hides of valuable livestock, and can be used for the close confinement of such animals. This is extremely important when being used as a fencing material to confine livestock such as thoroughbred race horses where any damage to the legs of the animal must be prevented.

A fence constructed according to the present invention is also highly pleasing to the eye, and the plastic may be colored in any fashion to suit the preferences of the user. The color of such a fense is an intrinsic property of the fencing material itself, rather than the result of the application of extrinsic paints or varnishes. Thus, the fence never need be painted, and maintenance is significantly reduced. Phosphorescent material may also advantageously be added to the plastic webbing so as to provide nocturnal visibility for both the animals being confined and the people responsible for the animals.

Installation of fencing material according to this invention are also greatly facilitated using the brackets of the present invention. Installation usually requires no more than one individual, and this individual is not exposed to the danger of harm inherent in the installation of barbed wire fence. Also, the fence comes in continuous lengths as rolls, which can be stored more safely and in less room than prior art fences such as barbed wire fencing. The plastic casing also protects the fencing material from deterioration during storage.

With the fence material of the preferred embodiment, the brackets of the present invention cooperate to facilitate installation as well as enhance the structural strength of the fence once installed. To this end, the present invention provides a novel fence bracket where, with the preferred embodiment of the fencing material, vertical support of a load on the fence is transmitted primarily through the wires encased in protruding portions of the fencing material and thence to the bracket instead of through the webbing between the encased wires.

Fences can be constructed having any number of wires encased in the plastic web material. For example, a fence according to the present invention can be comprised of two, three or even more wires encased in the plastic web with a two-wire fence strand having a width of about 2.5 inches and a three-wire fence strand having a width of approximately 5.5 inches.

BRIEF DESCRIPTION OF THE DRAWINGS

These and other advantages of the invention will become more readily apparent from the following detailed description of the presently preferred exemplary embodiments, taken together with the accompanying drawings, of which:

FIG. 5 is a front elevation of another embodiment of a securing staple according to the present invention;

FIG. 6 is yet another embodiment of a securing staple which might be used with the fencing material according to the present invention;

FIG. 10 is a front elevation of yet another embodiment of a fence according to the present invention;

DETAILED DESCRIPTION OF THE PREFERRED EMBODIMENTS

Figure 1:
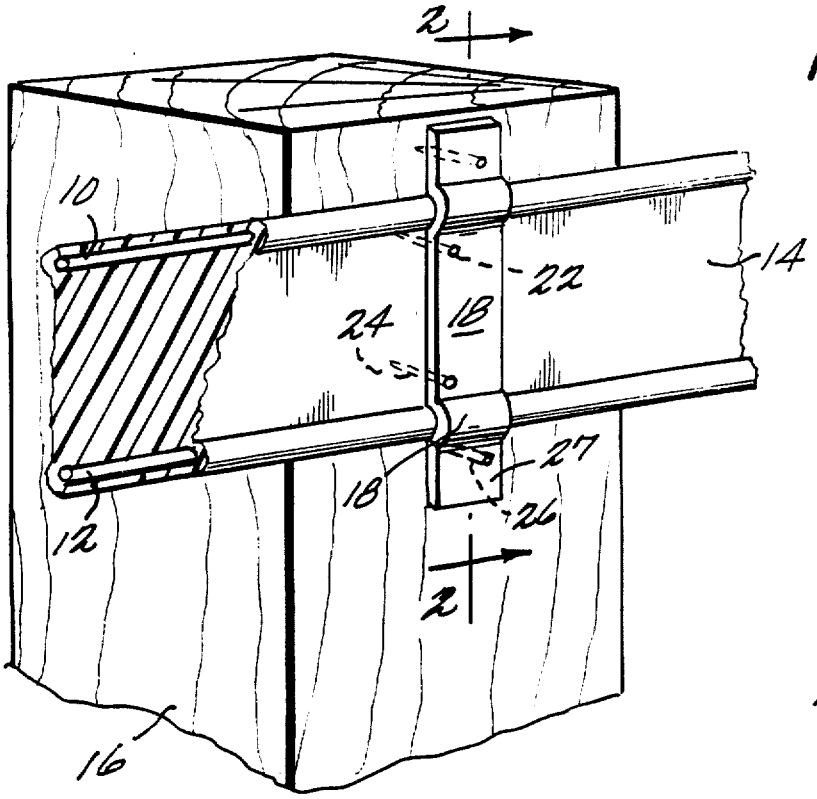
FIG. 1 is a partial cutaway of the fencing material according to one embodiment of the present invention, as it might be used with a securing staple according to the present invention.

Referring first to FIG. 1, a fence according to the present invention has two metal wires 10 and 12. In the present embodiment, 0.100 inch diameter steel wire (12½ gauge) is used having a tensile strength of approximately 250,000 pounds per square inch. It will be understood, however, that any wire having suitable characteristics may be used. Wires 10 and 12 are ensheathed in a plastic casing 14. Plastic casing 14 preferably has a thickness between 30 and 100 mils in the gap between wires. In the preferred embodiment, its thickness in the gap is approximately 0.050 inches and its thickness about wires 10 and 12 is such that the outside diameter of wire and sheath is approximately 0.200 inches. The vertical width of wires 10 and 12 and casing 14 is approximately 2.5 inches. In the presently preferred embodiment, casing 14 is composed to polyvinylchloride, although it will be understood that any suitable material may be used.

Casing 14 containing wires 10 and 12 is secured to a support 16 by means of a securing staple 18. Support 16 is typically a wood or concrete post. Securing staple 18 may be made of galvanized steel, and is deformed to follow the contour of plastic case 14. Securing staple 18 has four fasteners 20, 22, 24 and 26. Fasteners 20 and 26 are attached to tongues 21 and 27, respectively, and pierce support 16 respectively above and below casing 14. Fasteners 22 and 24 pierce casing 14 before entering support 16.

Figure 2:
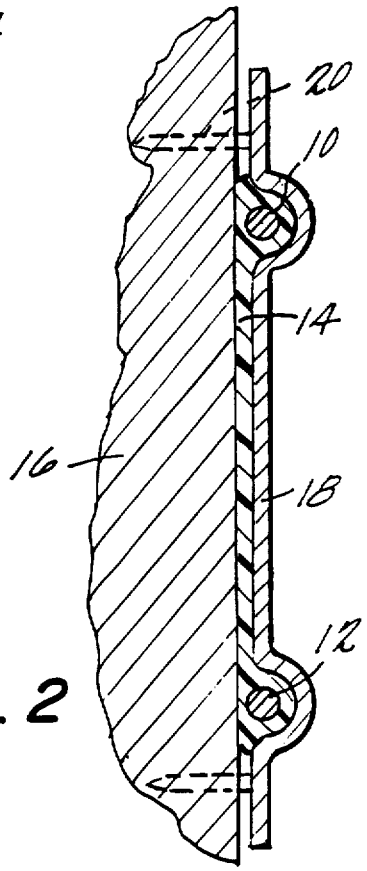
FIG. 2 is a cross-sectional view taken along line 2 of FIG. 1.

As can be seen best in FIG. 2, securing staple 18 presses against casing 14, securing casing 14 firmly in place.

Figure 3:
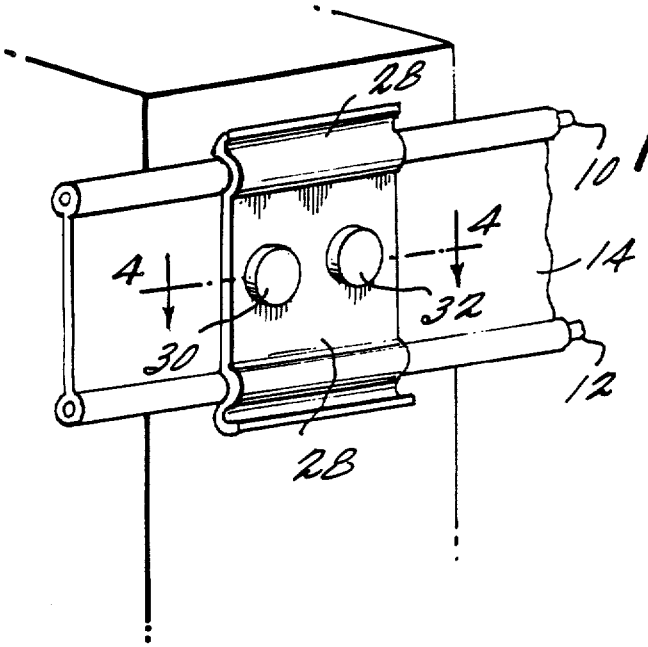
FIG. 3 is a front elevation of fencing material according to one embodiment of the present invention as it might be used with another securing staple according to the present invention.
Figure 4:
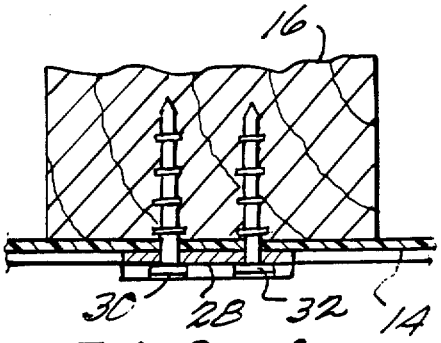
FIG. 4 is a cross-section of the fencing material and securing staple of FIG. 3 taken along line 4.

FIG. 3 again shows wires 10 and 12 contained in casing 14. In FIG. 3, a different securing staple 28 is used to secure casing 14 to support 16. Securing staple 18 may be made of galvanized steel or a similar material. Unlike securing staple 18 as illustrated in FIGS. 1 and 2, securing staple 28 has two ringed nails 30 and 32 instead of fasteners 20, 22, 24 and 26. These ringed nails are of the type which are commonly available commercially. In securing staple 28, these nails are arranged horizontally rather than vertically. Also, securing staple 28 has no tongues to accommodate prongs or nails in positions above or below casing 14. Ringed nails 30 and 32 can best be seen in the cross-sectional view along line 4 as illustrated in FIG. 4.

FIG. 5 shows yet another securing staple 34 which might be used to affix a casing 36 shown in phantom to a supporting member. Securing staple 34 has three semicircular bends 38, 40 and 42 to accommodate casing 40 where it assumes a roughly cylindrical shape to contain wires. Securing staple 34 is also provided with holes 44 and 46 to accommodate nails, screws, or other suitable fasteners.

Figure 7:
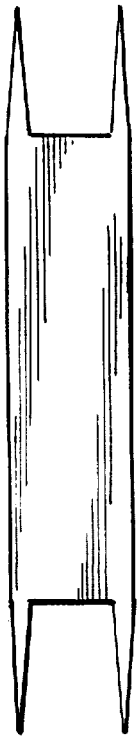
FIG. 7 is a securing staple of FIG. 6 prior to the final step in the fabrication of the securing staple of FIG. 6.

FIG. 6 shows another possible staple which may be used advantageously with the fencing material of the subject invention. The staple 48 of FIG. 6 is stamped from a pre-cut piece of galvanized steel shown in FIG. 7. Staple 48 has four prongs 50 which puncture and anchor in a supporting structure, such as a fence post, when driven by a hammer or other suitable means.

Figure 8:
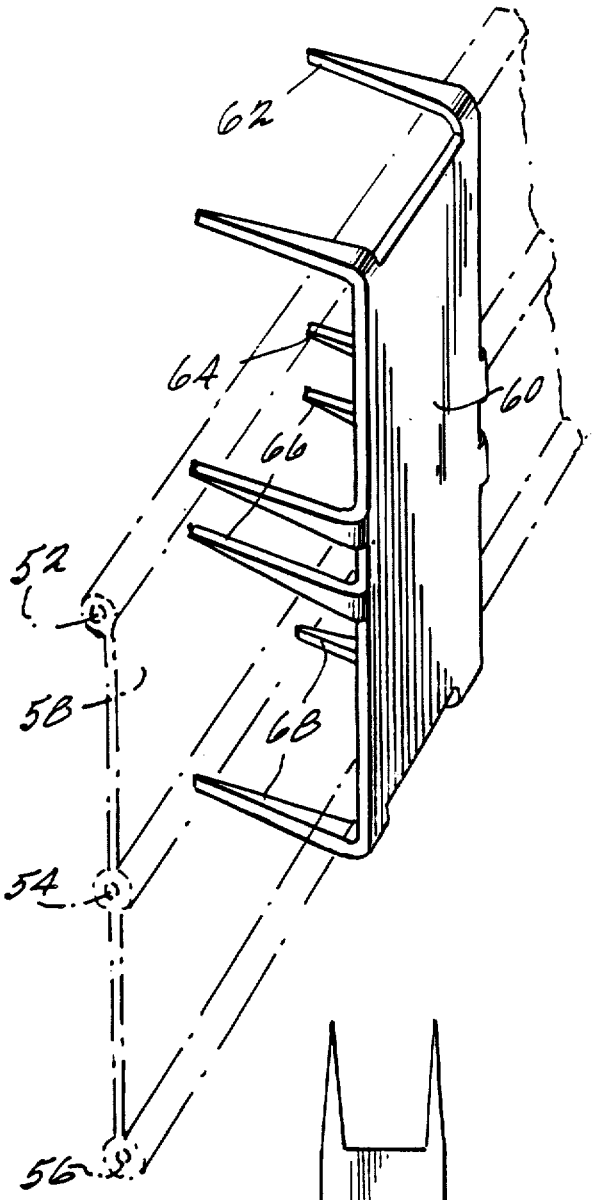
FIG. 8 is a front elevation of another embodiment of the fencing material according to the subject invention, shown with another securing staple according to the present invention.

FIG. 8 shows another embodiment of a fence according to the present invention. The fencing material in FIG. 8 has three wires 52, 54 and 56. Wires 52, 54 and 56 may be made of the same materials used to make wires 10 and 12 as shown in FIGS. 1, 2 and 3. A plastic casing 58 encloses all three wires as well as occupies the gap between wires. In the preferred embodiment, casing 58 is made of polyvinylchloride. A securing staple 60 is used to hold casing 58 in place. The securing staple 60 has pairs of integral planar prongs 62, 64, 66 and 68. Prong pairs 62 and 68 bracket casing 58 to either side of its width, while prong pairs 64 and 66 pierce casing 58 to either side of wire 54 before entering the support. It is important to note that staple 60, like staple 48, may be fabricated simply and inexpensively by stamping sheet metal.

Figure 9:
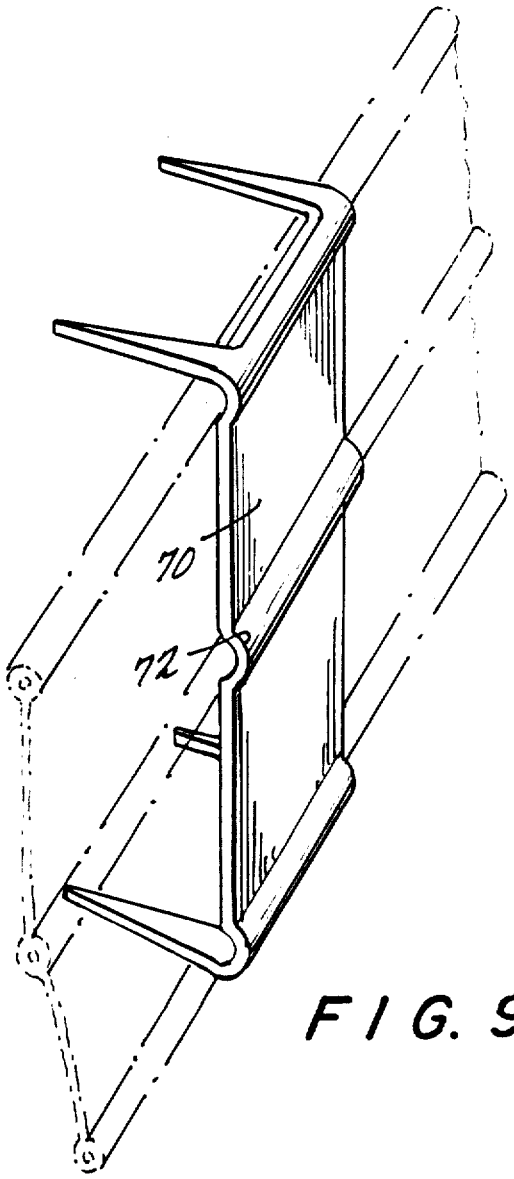
FIG. 9 is a front elevation of the fencing material shown in FIG. 7, shown with yet another embodiment of a securing staple according to the subject invention.

FIG. 9 shows an attachment staple 70 similar to staple 60, except that staple 70 has no prong pairs corresponding to prong pairs 64 and 66 of staple 60. Instead, staple 70 has a semicircular channel 72 to accommodate the bulge in the fencing material (shown in phantom) where it distends to accommodate a middle wire.

FIG. 10 shows another embodiment of the present invention which is suitable for use as a highway barrier.

A plastic casing 74 constructed of polyvinylchloride or other suitable material encloses seven wires 76. A securing staple 78 secures plastic casing 74 to support 80.

In the foregoing embodiments, much of the vertical support for the fencing is supplied by the bracket or staples 70 particularly where the fasteners pass through the staple and the web of the fencing material. In a preferred embodiment, however, the present invention provides fence brackets where no fastening members are required to penetrate and hold the fencing material in position on a fence post. Further, the brackets of the present invention are provided with openings which cooperate with the raised beads containing the high tensile wire so that any vertical load placed on the web fencing will be transmitted predominantly through the wire to the bracket and not to the webbing extending between the wires of the fencing. It has been found with the use of the brackets of the present invention, the fencing can be suspended between the posts and then subjected to tension to straighten the webbing to a substantially horizontal condition. Further, this arrangement has the advantage that when it is desired to remove the fencing it can be easily taken down and stored for later use at the same or at a different site.

Figure 11:
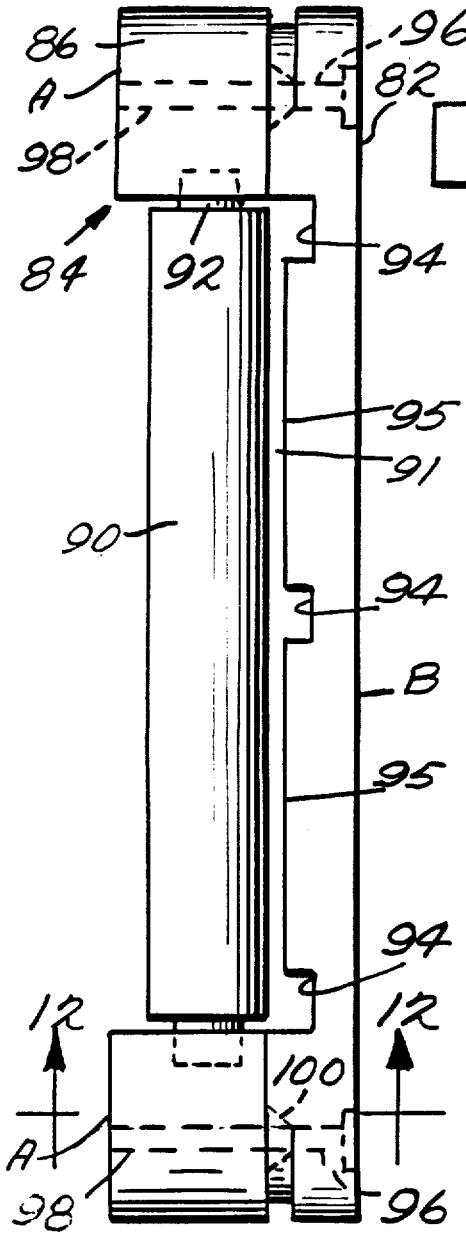
FIG. 11 is a side view in elevation of one embodiment of a bracket of the present invention.
Figure 12:
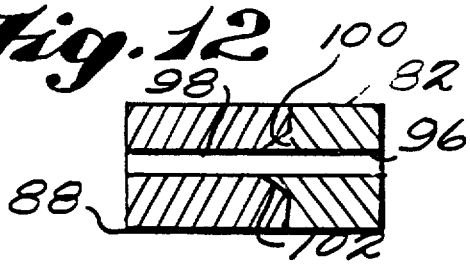
FIG. 12 is a sectional view along lines 12—12 of FIG. 11.

Turning now to FIG. 11, there is shown one embodiment of the bracket of the present invention indicated generally at 84. The bracket 84 includes a first elongated member 82 and a second member having spaced ends 86 and 88 between which a shaft 92 extends and on which is rotatably mounted a roller 90. Member 82 is provided with spaced recesses or notches 94 between which extend smooth rounded surfaces 95 which are spaced from the roller a selected distance to define an opening 91. At its opposite ends, the member 82 is provided with bore holes 96 which are alignable with bore holes 98 in the second member's ends 86 and 88. As shown in the sectional view of FIG. 12, bore hole 98 terminates in a flared outwardly tapering recess 100 into which is inserted a tapering protrusion 102 formed on the face of each end of the first elongated member 82. Similarly, bore holes 96 are also provided in each end of the member 82 and the protrusions 102 serve as aligning means to facilitate alignment of the bore holes 96 and 98.

Figure 13:
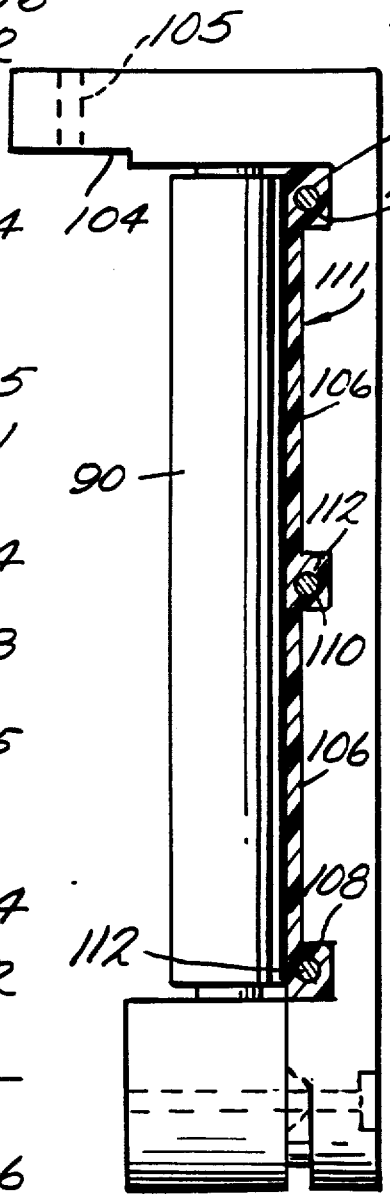
FIG. 13 is a side view in elevation of another embodiment of the bracket of the present invention.

In FIG. 13, a bracket member similar to that of FIG. 11 is shown but with a section of webbing 111 located in the opening between the roller 90 and the smooth facing surfaces 106 of this bracket member. As can be seen from FIG. 13, the enlarged protrusions 108 and 110 of the webbing 111 fit snugly in the recesses 112 formed in one face of the opening between the roller 90 and surfaces 106. The webbing material 111 in this embodiment has the protruding portions formed such that the reinforcing wires 112 will be offset from the plane of the webbing. The side of the webbing opposite that on which the wires 112 are located is generally flat and smooth. With this arrangement, when the top edge of the webbing 111 is subjected to a load, the wires 112 will transmit the load to the lower surfaces of the recesses 108 and 110 instead of transmitting the load to the web material extending between the wires.

The bracket means utilizing the roller 90 are generally employed as the fence material is led around a corner or bend in the fence arrangement.

Figure 14:
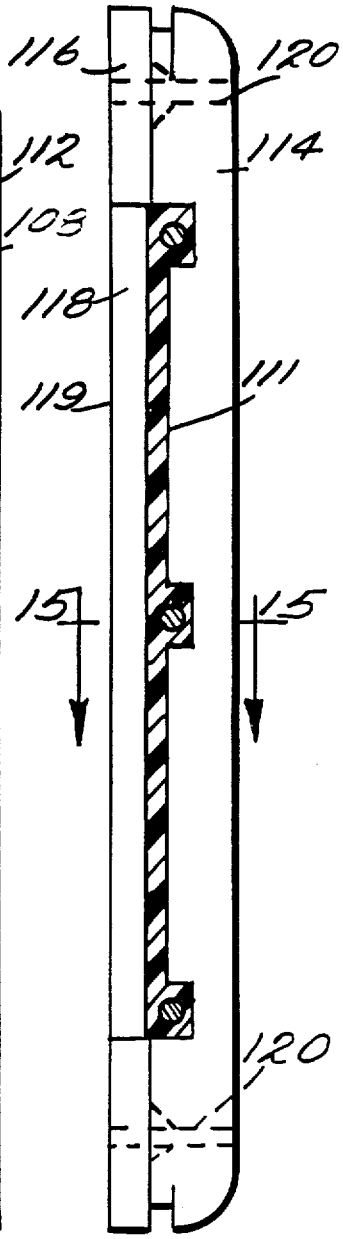
FIG. 14 is a side view in elevation of another embodiment of the bracket of the present invention.
Figure 15:
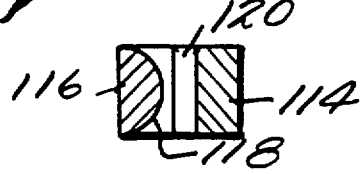
FIG. 15 is a view taken along lines 15—15 of FIG. 14.

In FIG. 14, another type of bracket is illustrated which has a member 114 which is in all respects identical to member 82 of the previous embodiment but which has a simplified mating member 116. Mating member 116 is elongated and between its ends is provided with a smooth generally semicircular surface 118 and a flat backside 119 as can be seen in the sectional view of FIG. 15. The disposition of the webbing 111 is generally the same as that in the embodiment of FIGS. 11 and 13. At each end of the bracket 114, bore holes 120 are provided which are substantially identical to the arrangement shown in FIG. 12.

Figure 16:
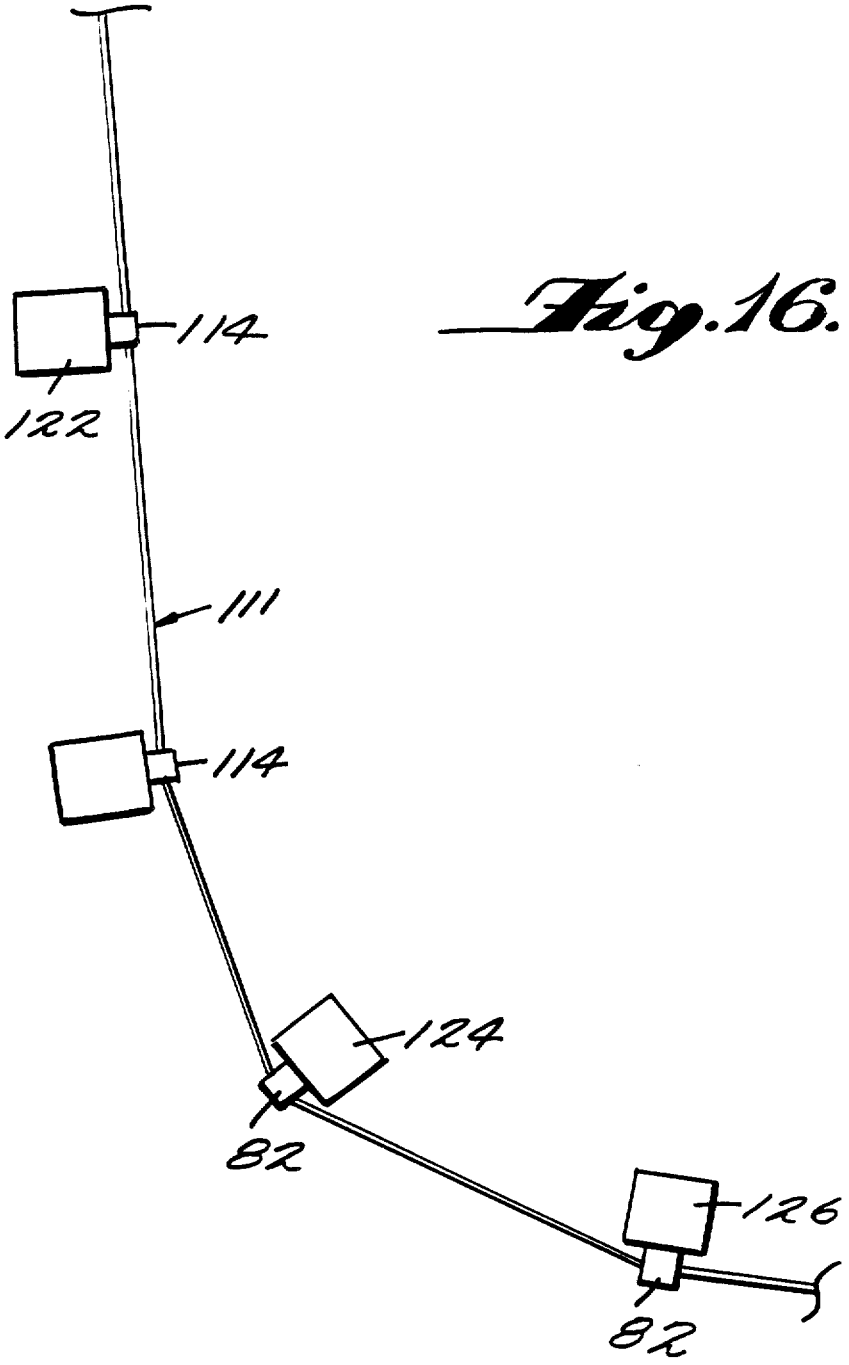
FIG. 16 is a top plan view of one illustration of an installation of the fencing and brackets of the present invention.

Turning to FIG. 16, there is shown an arrangement of the brackets and fencing of the present invention where the fence posts 122 are arranged around a corner of an enclosure. Where the webbing is arranged to traverse a straight line, the brackets 114 can be mounted on the inside of the enclosure as illustrated in FIG. 16 up to the point of the turn as at fence post 124 where a bracket such as illustrated in FIG. 11 will be mounted on the outside of the enclosed area with the roller 90 closest to the fence and the member 82 with the notched recesses 94 facing the roller. That is to say, the surfaces labelled A in FIG. 11 will be attached directly to the fence post, while the surface B of FIG. 11 will be facing away from the post 124. The same arrangement would be used for a post 126, although it will be understood that this example is merely for illustrative purposes and more or less posts may be employed in a curve or turn in the fence being installed.

Figure 18:
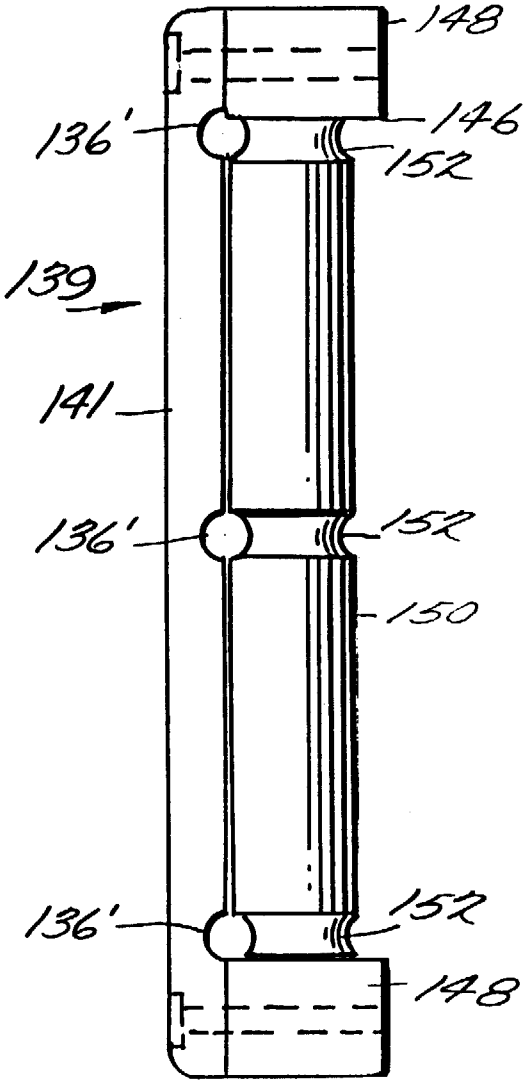
Figure 17:
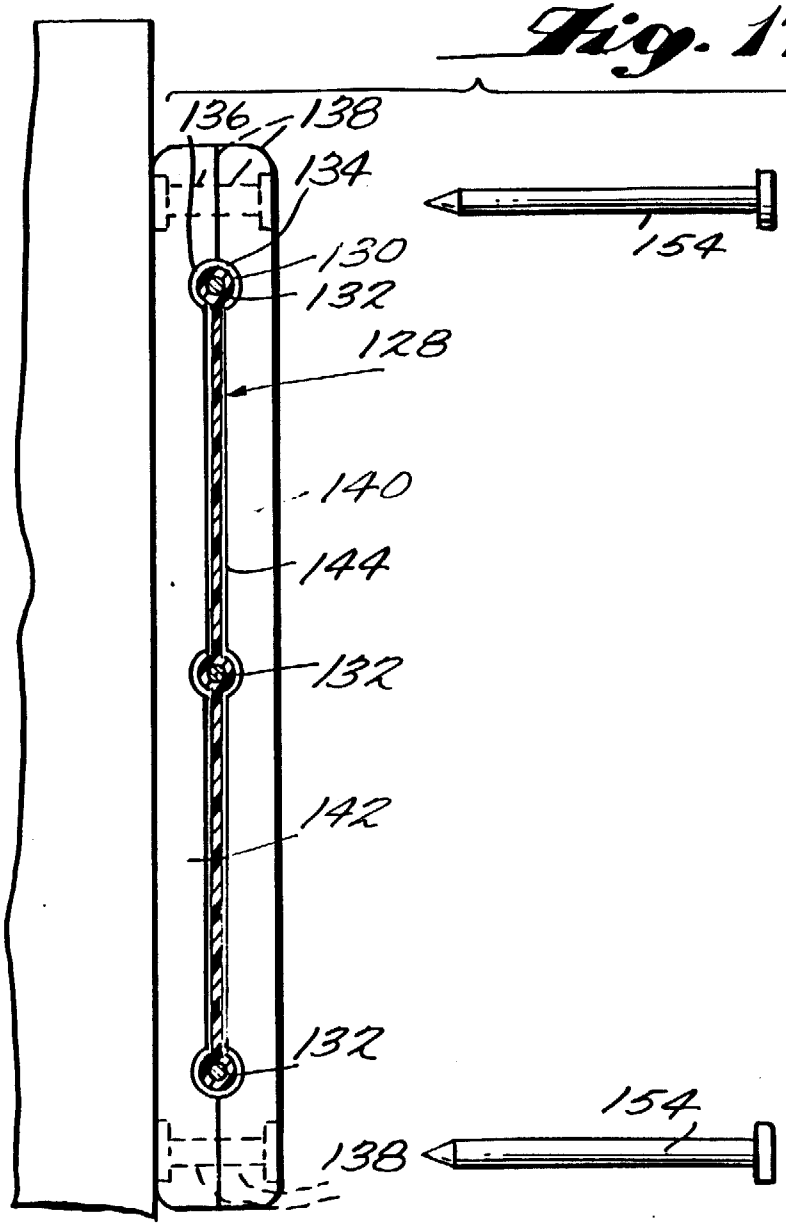

Turning now to FIGS. 17 and 18, another embodiment of the present invention is illustrated wherein the webbing material 128 takes a slightly different form similar to that illustrated in FIG. 2 except that the enlarged portion of the webbing are circular as at 130 with the individual wires 132 generally centered in each enlarged circular portion 130. Correspondingly, the bracket members 140 and 142 are modified wherein the notch means are in the form of enlarged openings 134 and 136 which are generally semicircular in cross-section to receive in a closely fitting relation the enlarged portions 134 of the webbing 128. Each of the bracket members 140 and 142 are, of course, provided with aligned holes 138 for receiving fastening elements such as nails 154. The opening 144 between the facing surfaces of the bracket members 140 and 142 is substantially less than the diameter of the opening formed by the opposed surfaces 134 and 136 so that the enlarged portions 130 containing the wires 132 cannot slip through the opening 144 when a load is placed on the webbing 128.

As shown in FIG. 18 a corner bracket 139 is illustrated which has one element 141 similar to bracket member 140 whereas the second bracket member is provided with spaced end elements 148 having openings for fastening elements and a shaft 146 supporting a roller 150. The roller 150 has spaced grooves 152 opposite the semicircular openings 136' corresponding to the openings 136 in the bracket member illustrated in FIG. 17. The roller bracket 139 will thus accommodate a webbing as illustrated in section at 128 in FIG. 17. The advantage of this arrangement is that, in installing the webbing 128, the webbing can be placed entirely either on the inside or the outside of the fencing relative to the space being enclosed without reversing the position of the support brackets when rounding a bend as illustrated in FIG. 16. This is due to the fact that the webbing 128 is identical on its opposite sides and the bracket members 140, 142 and 139, 150 will accommodate the webbing 128 without regard to the side of the fence post on which the brackets or webbing are disposed.

It has been found that it is easier to subject the fence to tension once installed by wrapping the fence on the rollers 90 as the fence is led around a bend or turn in the enclosure yet, according to the present invention, this is achieved without losing the vertical support for the wires by virtue of the notches 94 formed in the first member 82 of the bracket arrangement.

It will be apparent that any number of wires may be encased in the plastic webbing as in the previous embodiments and a corresponding number of notches will be required for the brackets of this embodiment, with the notches spaced to accommodate the spacing between the wires and plastic material enclosing the wires. It is important, however, that the opening 91 between the members of the bracket have a width such that the webbing cannot be moved to shift the protruding portions of the webbing out of the notches 94. In some arrangements, it may be desirable that the opening be slightly smaller than the thickness of the web so that the webbing 111 and the enlarged portions of the webbing that surround the wires will be squeezed between the two cooperating bracket members. In installing the brackets, the installer will drive a fastening member such as a threaded screw through the holes provided at each end of the bracket members to a limited degree whereupon the webbing will be passed through the openings 91 in each bracket member until the desired length of fencing is in place. Then, the installer will tighten the screws to bring the outer bracket member into firm engagement with the first bracket member to complete the installation.

Although several embodiments of this invention have been described in detail above, those skilled in the art will readily appreciate that many modifications not described in detail above are possible without departing from the novel teachings and advantages of this invention. Accordingly, all such modifications are intended to be included within the scope of this invention as defined by the following claims.

What is claimed is:

1. A fence comprising, in combination, an elongated web of vinyl plastic having spaced, substantially parallel edges along its length and a substantially flat web portion, each edge having an enlarged cross-section relative to said flat web portion and encasing a high tensile wire with each wire lying substantially in the plane of said web, a plurality of support bracket means for mounting on spaced fence posts, each bracket means having a first and a second bracket member with a face of each bracket member having recess means for receiving a portion of said spaced edges and said web of vinyl plastic and being alignable with the recess means on said second bracket member, the dimensions of said recess means when said bracket members are joined together being such that, when a load is applied to said elongated web, the surfaces of said recess means will prevent said edges of said web from moving out of said recess means, said bracket means having apertures for receiving fastening members for attaching said bracket means to a fence post.

2. A fence comprising, in combination, an elongated web of vinyl plastic having spaced, substantially parallel edges along its length and a substantially flat web portion, each edge having an enlarged cross-section relative to said flat web portion and encasing a high tensile wire with each wire lying substantially in the plane of said web, a plurality of support bracket means for mounting on spaced fence posts, each bracket means having a first and a second bracket member with a face of each bracket member having recess means for receiving a portion of said spaced edges and said web of vinyl plastic and being alignable with the recess means on said second bracket member, the dimensions of said recess means when said bracket members are joined together being such that, when a load is applied to said elongated web, the surfaces of said recess means will prevent said edges of said web from moving out of said recess means, some of said bracket means having a first bracket element having spaced notches and a second bracket element comprising an elongated roller rotatably mounted between spaced support elements, said roller having circumferential grooves for accommodating the portions of said web encasing said wires.

3. The fence as claimed in claim 2 wherein a third wire is provided intermediate said spaced edges and is encased in said vinyl plastic with said third wire extending parallel to said spaced edges and said bracket means having notch means for accommodating said third wire, said notch means being located intermediate the opening in said bracket means.

4. The bracket as claimed in claim 2 having aperture means for receiving fastening members for attaching said bracket member to a fence post.

*5. A fence comprising, in combination, an elongated web of vinyl plastic having spaced, substantially parallel edges along its length and a substantially flat web portion, each edge having an enlarged cross-section relative to said flat web portion and encasing a high tensile wire, a plurality of support bracket means for mounting on spaced fence posts, said bracket means having a face with recess means for receiving, in use, a portion of said spaced edges and said web of vinyl plastic such that each of said high tensile wires lies in a plane offset from said web portion, the dimensions of said recess means being such that, when a load is applied to said fence, said load will be transmitted predominantly through the wire to the recess means rather than to the web, and the surfaces of said recess means will prevent said edges of said web from moving out of said recess means, said bracket means having apertures for receiving fastening members for attaching said bracket means to a fence post.*

*6. A fence comprising, in combination, an elongated web of plastic material having spaced, substantially parallel edges along its length and a substantially flat web portion, each edge having an enlarged cross-section relative to said flat web portion and encasing a high tensile wire, a plurality of support bracket means for mounting said elongated web so that said web will extend between spaced fence posts, at least some of said bracket means having a face with recess means for receiving, in use, a portion of said spaced edges and said web of plastic material such that each of said high tensile wires lies in a plane offset from said web portion, the dimensions of said recess means being such that, when a load is applied to said fence, said load will be transmitted predominantly through the wire to the recess means rather than to the web, and the surfaces of said recess means will prevent said edges of said web from moving out of said recess means, said bracket means having means for attaching said bracket means to a fence post.*

*7. A fence comprising, in combination, an elongated web of plastic material having spaced, substantially parallel edges along its length and a substantially flat web portion, each edge having an enlarged cross-section relative to said flat web portion and encasing a high tensile wire, means associated with spaced fence posts for mounting said elongated web so that said web will extend between said spaced fence posts, at least some of said mounting means having a*

*face with recess means for receiving, in use, a portion of said spaced edges and said web of plastic material such that each of said high tensile wires lies in a plane offset from said web portion, the dimensions of said recess means being such that, when a load is applied to said fence, said load will be transmitted predominantly through the wire to the recess means rather than to the web, and the surfaces of said recess means will prevent said edges of said web from moving out of said recess means.*

* * * * *